G. W. DOVER.
LATHE TOOL.
APPLICATION FILED MAY 16, 1919.
1,328,947.
Patented Jan. 27, 1920.
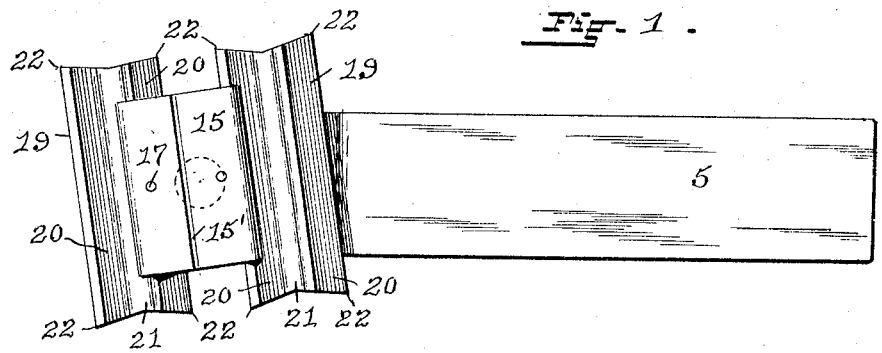
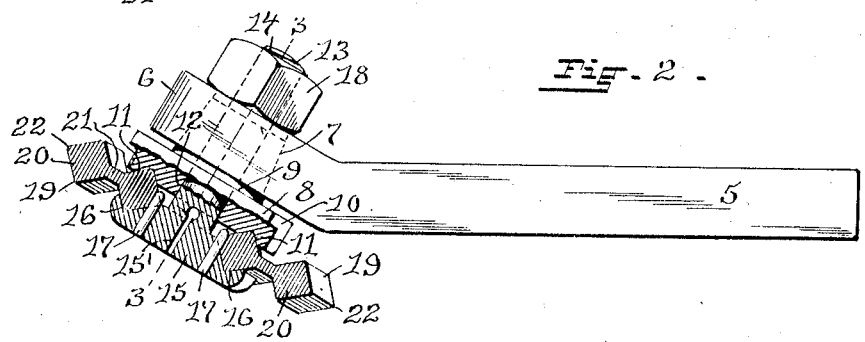
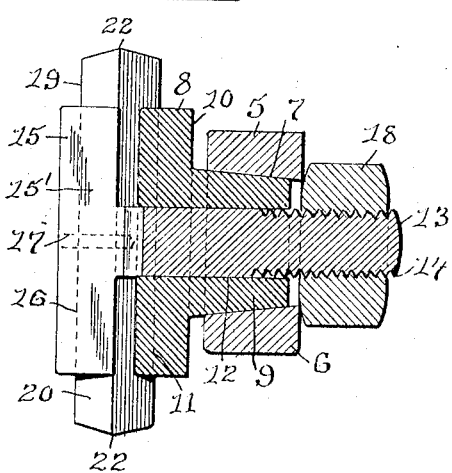
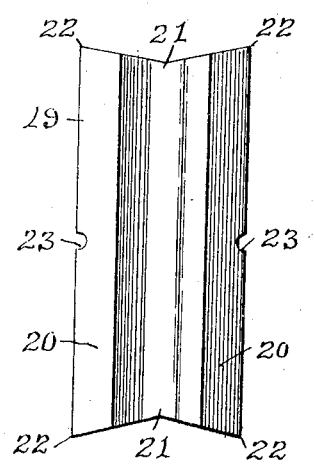
INVENTOR:
George William Dover
By Chas. H. Luther
ATTORNEY.

UNITED STATES PATENT OFFICE.

GEORGE WILLIAM DOVER, OF CRANSTON, RHODE ISLAND.

LATHE-TOOL.

1,328,947.  Specification of Letters Patent.  Patented Jan. 27, 1920.

Application filed May 16, 1919. Serial No. 297,499.

*To all whom it may concern:*

Be it known that I, GEORGE WILLIAM DOVER, a citizen of the United States, residing at Cranston, in the county of Providence and State of Rhode Island, have invented a new and useful Improvement in Lathe-Tools, of which the following is a specification.

This invention has reference to an improvement in lathe tools and more particularly to an improvement in a lathe tool having a plurality of cutting points.

The object of my invention is to improve the construction of a lathe tool, whereby the number of cutting points is materially increased, the members having the cutting point in use adjusted to any angle required, the cutting points may be reversed and as it is only required to take the tool once to the grind stone to grind the plurality of cutting points, the time heretofore required to take such tools to and from the grind stone, is greatly reduced.

My invention consists in the peculiar and novel construction of an adjustable lathe tool having two twin parallel cutting members, each cutting member having four cutting points, said lathe tool having details of construction as will be more fully set forth hereinafter and claimed.

Figure 1 is a side view of my improved lathe tool.

Fig. 2 is a top view of the lathe tool partly in section.

Fig. 3 is an enlarged transverse sectional view through the lathe tool, taken on line 3.3 of Fig. 2, and Fig. 4 is an enlarged side view of one of the twin cutting members.

In the drawing 5 indicates a holder in the form of a rectangular shaped bar having preferably a bent end 6 in which is a transverse round tapered hole 7. A rotatable adjusting member 8 has a round tapered hub 9 which fits in the tapered hole 7, a rectangular shaped head 10 in the face of which are two parallel V shaped grooves 11.11 and a central bolt hole 12 which extends through the hub and head, as shown in Fig. 3. A bolt 13 extends through the bolt hole 12 and has a screw-threaded end 14 and a rectangular shaped head 15 in the back of which are two parallel V shaped grooves 16.16 in oppositely disposed relation to the grooves 11.11 in the head of the adjusting member 8. Extending out of the back of the head 15 at each side of the bolt stem is a pin 17, as shown in Fig. 2. A nut 18 is in screw-thread engagement with the screw-threaded end 14 of the bolt 13 and bears on the end 6 of the holder 5 as shown in Figs. 2 and 3. The holder 5 carries two twin cutting members 19.19, between the head of the adjusting member and the head of the bolt. Each cutting member is constructed in the form of two square parallel bars 20.20 connected at their inner edges by a web 21, each cutting member having four cutting points 22.22.22.22, and a central nick 23 in their outer edges, as shown in Figs. 2 and 4. When assembled the cutting members enter the grooves in the heads of the adjusting member and bolt, the pins 17.17 enter the nicks 23.23 in the cutting members 19.19 to locate the cutting members and the tool carries a plurality of cutting points sharpened and ready for use. By loosening the nut 18 a new cutting point may be instantly swung around and brought into use, the cutting members may be placed at any angle required for lathe or planer use, and when so placed they are rigidly secured to the holder by tightening the nut 18 on the bolt 13.

It is evident that the cutting members 19.19 could be constructed to give any shape of cutting point desired in which case the grooves 11.11 in the head of the adjusting member 8, and 16.16 in the bolt head 15 would be correspondingly changed and other details of construction could be varied within the scope of the appended claims.

Having thus described my invention I claim as new:

1. A lathe tool comprising a holding member having a transverse hole, a rotatable adjusting member in the transverse hole and having a bolt hole and a head in which is a groove, a bolt extending through the bolt hole and having a head in which is a groove corresponding to the groove in the head of the adjusting member, a cutting member in the grooves in the heads of the adjusting member and the bolt and means on the bolt engaging with the holding member for simultaneously clamping the cutting member between the head of the adjusting member and the head of the bolt and securing the adjusting member in the adjusted position.

2. A lathe tool comprising a holding member having a transverse tapered hole, a rotatable adjusting member having a tapered hub in the tapered transverse hole, a bolt hole and a head in which is a groove, a bolt extending through the bolt hole and having a head in which is a groove corresponding to the groove in the head of the adjusting member, a cutting member in the grooves in the heads of the adjusting member and bolt and means on the bolt engaging with the holding member for simultaneously clamping the cutting member between the head of the adjusting member and the head of the bolt and securing the adjusting member in the adjusted position.

3. A lathe tool comprising a holding member having a round transverse tapered hole at one end, a rotatable adjusting member having a round tapered hub in the transverse hole, a bolt hole and a head in which are two parallel grooves, a bolt extending through the bolt hole and having a head in which are two oppositely disposed parallel grooves corresponding to the parallel grooves in the head of the adjusting member, cutting members in the parallel grooves in the heads of the adjusting member and bolt and means on the bolt engaging with the holding member for simultaneously clamping the cutting members between the head of the adjusting member and the head of the bolt and securing the adjusting member in the adjusted position.

4. A lathe tool comprising a holding member having a round transverse tapered hole at one end, a rotatable adjusting member having a round tapered hub in the transverse hole, a bolt hole and a head in which are two parallel grooves, a bolt extending through the bolt hole and having a head in which are two oppositely disposed parallel grooves, twin cutting members in the parallel grooves in the heads of the adjusting member and bolt and means on the bolt engaging with the holding member for simultaneously clamping the twin cutting members between the head of the adjusting member and the head of the bolt and securing the adjusting member in the adjusted position.

5. A lathe tool comprising a holding member having a round transverse tapered hole at one end, a rotatable adjusting member having a round tapered hub in the transverse hole, a bolt hole and a head in which are two parallel grooves, a bolt extending through the bolt hole and having a head in which are two oppositely disposed parallel grooves, twin cutting members in the parallel grooves in the heads of the adjusting member and bolt, each of said twin cutting members being in the form of two parallel cutting bars having a web connecting the bars and means on the bolt engaging the holding member for simultaneously clamping the twin cutting members between the head of the adjusting member and the head of the bolt and securing the adjusting member in the adjusted position.

6. A lathe tool comprising a holding member having a bent end and a round tapered transverse hole in the bent end, a rotatable adjusting member having a round tapered hub in the transverse hole, a bolt hole and a head in the face of which are two parallel V-shaped grooves, a bolt extending through the bolt hole and having a screw-threaded end and a head in the back of which are two oppositely disposed parallel grooves and two pins, twin cutting members in the parallel grooves in the heads of the adjusting member and the bolt, each of said twin cutting members being in the form of two parallel bars which form the cutting points and which have a web connecting the bars and a central nick in their outer edges for the pins on the head of the bolt, a nut on the screw-threaded end of the bolt and engaging with the bent end of the holder for simultaneously clamping the twin cutting members between the head of the adjusting member and head of the bolt and securing the adjusting member in the adjusted position.

7. In a lathe tool according to claim 5 the twin cutting bars having, in cross section, the shape of the cutting points, whereby four cutting points are formed on each cutting member.

8. In a lathe tool according to claim 6 the twin cutting bars having in cross section, the shape of the cutting points and a central nick in each outer edge whereby four cutting points are formed on each cutting member, as described.

In testimony whereof I have signed my name to this specification.

GEORGE WILLIAM DOVER.